US008167355B2

(12) United States Patent
Guetet (10) Patent No.: US 8,167,355 B2
(45) Date of Patent: May 1, 2012

(54) DEVICE FOR LOCKING A RETRACTABLE ROOF, AND VEHICLE EQUIPPED WITH SUCH A SYSTEM (75) Inventor: David Guetet, Moncoutant (FR)

(73) Assignee: Heuliez SAS, Cerizay (FR)

( * ) Notice: Subject to any disclaimer, the term of this patent is extended or adjusted under 35 U.S.C. 154(b) by 480 days.

(21) Appl. No.: 12/297,937

(22) PCT Filed: Apr. 18, 2007

(86) PCT No.: PCT/FR2007/000648
§ 371 (c)(1),
(2), (4) Date: Jan. 18, 2009

(87) PCT Pub. No.: WO2007/122318
PCT Pub. Date: Nov. 1, 2007

(65) Prior Publication Data
US 2009/0261625 A1 Oct. 22, 2009

(30) Foreign Application Priority Data

Apr. 21, 2006 (FR) ...................... 06 51408
Jul. 27, 2006 (FR) ...................... 06 06901

(51) Int. Cl.
B60J 7/19 (2006.01)

(52) U.S. Cl. .... 296/108; 296/121; 296/128; 296/107.17

(58) Field of Classification Search ............... 296/108, 296/121, 128, 107.17, 224
See application file for complete search history.

(56) References Cited

U.S. PATENT DOCUMENTS 5,154,479 A * 10/1992 Sautter, Jr. ............... 296/121
5,269,586 A * 12/1993 Hahn et al. ............... 296/224
5,678,881 A * 10/1997 Tokarz ...................... 296/121
6,318,793 B1 * 11/2001 Rapin et al. ............ 296/107.17
6,347,828 B1 * 2/2002 Rapin et al. ............ 296/107.17
6,585,310 B1 * 7/2003 Guillez et al. ............. 296/108
6,746,073 B2 * 6/2004 Heller et al. ............... 296/121
6,786,529 B2 * 9/2004 Hasselgruber et al. ..... 296/108
6,799,789 B2 * 10/2004 Guillez et al. ............. 296/121
6,837,535 B2 * 1/2005 Plesternings .............. 296/121
6,953,217 B2 * 10/2005 Hasselgruber et al. ..... 296/121
7,118,162 B2 * 10/2006 Queveau et al. ........... 296/108
7,597,380 B1 * 10/2009 Adjwok ................. 296/107.08
7,654,605 B2 * 2/2010 Hayashi et al. ............ 296/121

(Continued)

FOREIGN PATENT DOCUMENTS

FR 2 859 413 A1 3/2005
FR 2 870 788 A1 12/2005
WO WO 2006/013249 A 2/2006

Primary Examiner — Glenn Dayoan
Assistant Examiner — Gregory Blankenship
(74) Attorney, Agent, or Firm — Arent Fox LLP (57) ABSTRACT The invention relates to a device (9) for locking a retractable roof of a motor vehicle (2), comprising: a strike (11) fixed to a lateral roof element (7a, 7b); a locking finger (12) pivotally mounted on a support (13) fixed to the front roof element (3) between an unlocked position and a locked position in which said finger (12) exerts on the strike (11) a force along a substantially vertical axis Z so as to press the lateral roof element (7a, 7b) towards its covering position in which it bears on the central element (6) and/or on the front element (3). The invention also relates to a locking system, a retractable roof and a vehicle equipped with such a device.

12 Claims, 5 Drawing Sheets

U.S. PATENT DOCUMENTS

| | | | |
|---|---|---|---|
| 2004/0046417 A1* | 3/2004 | Guillez et al. | 296/121 |
| 2005/0242617 A1* | 11/2005 | Guillez et al. | 296/121 |
| 2005/0264025 A1* | 12/2005 | Queveau et al. | 296/108 |
| 2008/0258492 A1* | 10/2008 | Brockhoff | 296/121 |
| 2009/0140555 A1* | 6/2009 | Hayashi et al. | 296/224 |
| 2009/0261625 A1* | 10/2009 | Guetet | 296/224 |

* cited by examiner

DEVICE FOR LOCKING A RETRACTABLE ROOF, AND VEHICLE EQUIPPED WITH SUCH A SYSTEM

CROSS-REFERENCE TO RELATED APPLICATION

This application is a National Stage entry of International Application No. PCT/FR2007/000648, filed Apr. 18, 2007, the disclosure of the prior applications are incorporated in its entirety by reference.

The invention relates to a device for locking a retractable roof composed of a front roof element and a rear roof element, making it possible to lock the front roof element on the rear roof element. The invention also relates to a system for locking a retractable roof comprising a locking device making it possible to fix the front roof element to a fixed part of the vehicle and a device for locking the front roof element on the rear roof element.

The invention also relates to a vehicle equipped with such a locking system.

In the prior art, systems for locking a retractable roof which are composed of at least one front roof element and one rear roof element, are known, making it possible to lock together the front and rear roof elements on a fixed part of the body of the vehicle.

A system of this type is more particularly disclosed in the patent application FR 2 870 788, in the name of the applicant.

However, prior art systems have drawbacks.

As a matter of fact, the device for locking the front roof element on the rear roof element does not make it possible to exert an important locking force.

In addition, the systems are not particularly adapted to the retractable roofs equipped with a rear roof element comprising a central rear roof element and lateral elements forming rear quarters.

As a matter of fact, the particularity of the locking of such roof type lies in the fact that the lateral elements are movable with respect to the central element. Thus, the locking device must make it possible to lock the lateral elements in an exact position. As a matter of fact, it is important to provide an accurate relative positioning of the roof elements so as to provide a continuity of the roof body lines and the structural rigidity thereof.

In addition, the known systems are complex, cumbersome and do not make it possible to block the locking in a totally reliable way. Thus, the locking movable members can be displaced towards the unlocked position thereof, when an external force is applied thereon, for example upon an impact on the retractable roof.

In addition, the force of the actuator is generally applied transversally to the retractable roof whereas the transversal resistance of the roof is weak. Thus, the locking force is limited.

The invention thus aims at remedying such problems by providing simple and compact locking device and system making it possible to apply an important locking force in order to provide a correct resistance of the roof and also making it possible to provide an accurate positioning of the roof elements.

The invention also aims at embodying a locking device and a locking system which can be reliably blocked in the locking position, so that the locking movable member moves towards the unlocked position thereof upon the intentional motion of the actuator only.

Finally, the locking device according to the invention also aims at an accurate positioning of the retractable roof with respect to the vehicle.

According to a first aspect, the invention relates to a device for locking the retractable roof of the motor vehicle comprising at least one front roof element and one rear roof element, the front roof element being pivotally mounted on a rear roof element and the rear roof element being pivotally mounted on the frame of the vehicle, the front and rear roof elements being movable between the position for covering the passenger compartment of the vehicle and a position retracted towards the rear trunk of the vehicle, the rear roof element comprising a central element and two lateral elements positioned on either side of the central element and pivotally mounted thereon.

The locking device includes:
a strike fixed to a lateral roof element;
a locking finger pivotally mounted on a support fixed to the front roof element between an unlocked position and a locked position in which said finger exerts on the strike a force along a substantially vertical axis Z so as to press the lateral roof element towards its covering position in which it bears on the central element and/or a front element.

Thus, the locking force may be important and the locking device is particularly adapted to a retractable roof equipped with two lateral roof elements forming rear quarters.

Advantageously, the locking device further comprises a first and a second positioning member respectively fixed to the front roof element and fixed to the lateral roof element; the second member bearing on a bearing area of the first member under the effect of said locking force, when the roof elements are in the covering position, the bearing area being gone through by the axis Z and substantially perpendicular thereto.

Thus, the first positioning member forms a bearing surface of the lateral element on the front roof element.

In addition, the first and the second positioning members allow an accurate relative positioning of the roof elements.

Finally, the bearing area gone through by the axis Z and substantially perpendicular thereto, makes it possible to provide a correct resistance of the roof without any deformation thereof.

Advantageously, the axis Z is centred on the bearing area of the first positioning member.

Advantageously, the strike forms a second positioning member, the locking finger forcing the strike against the first positioning member when said finger is in the locked position. Thus, the number of elements composing the device is limited.

In one embodiment, the strike substantially has the shape of a U, the branches of which are fixed to the rear roof element. The first member has a bottom forming a bearing area for the strike and flared lateral edges making it possible to laterally position the strike in order to laterally position the rear roof element with respect to the front roof element. The strike bearing area makes it possible to vertically position the rear roof element with respect to the front roof element.

In a first embodiment, the finger is slidingly mounted on the support. The sliding finger has a slide and the support has two guiding pins engaged in said slide in order to guide the motion of the sliding finger.

Advantageously, the sliding finger has a surface contacting the bevelled strike.

In a second embodiment, the finger is rotatingly mounted on the support. The finger has a slide and the support has at least one slide, an axis controlled by said actuator being movable both in the finger slide and in the support slide.

In one embodiment, the support is composed of two plates fixed to each other in a front part and splitting at a rear part so as to form a recess for the locking finger. Thus, the device is compact.

According to a second aspect, the invention also relates to a system for locking a retractable roof of a motor vehicle comprising:
- a rear locking device of the front roof element on a rear roof element comprising:
- a rear support fixed to the front roof element positioned close to the rear edge thereof;
- a strike fixed to the rear roof element;
- a locking finger pivotally mounted on said rear support between an unlocked position and a locked position on the strike;
- a front locking device of the front roof element on a fixed part of the vehicle comprising:
- a front support fixed to the front roof element and positioned close to the front edge thereof;
- a locking member mounted pivotally on said support between an unlocked position and a locked position on the strike fixed to a fixed part of the vehicle.

The front locking device or the rear locking device is equipped with a single actuator making it possible to control the locking motion of the locking member or of the locking finger, said locking system further comprising a motion transmission device arranged for transmitting the motion of the actuator of the front locking device towards the rear locking device or of the rear locking device towards the front locking device.

Advantageously, the actuator is positioned inside the front or rear locking device. Thus, the locking device has a compact shape.

Advantageously, the front locking device includes means for transmitting the motion of the actuator to the locking member, said transmission means being arranged so as to be positioned in a stable position in which the transmission means can move towards their unlocked position only through a motion of the actuator, when the front locking device is in the locked position thereof.

According to a third aspect, the invention also relates to a retractable roof. Advantageously, the retractable roof includes two locking systems positioned close to the lateral edges of said retractable roof. Thus, the locking force may be very important since the lateral edges of the retractable roof are more resistant than the rest of the roof and may possibly be reinforced.

Eventually, according to a fourth aspect, the invention also relates to a motor vehicle equipped with a retractable roof according to a third aspect of the invention.

Other objects and advantages of the invention will appear upon reading the following description, and referring to the appended drawings, in which.

While referring to FIGS. 1 to 8, a system 1 for locking a retractable roof is described as well as a motor vehicle 2 having a retractable roof equipped with such a system 1.

Figure 5:
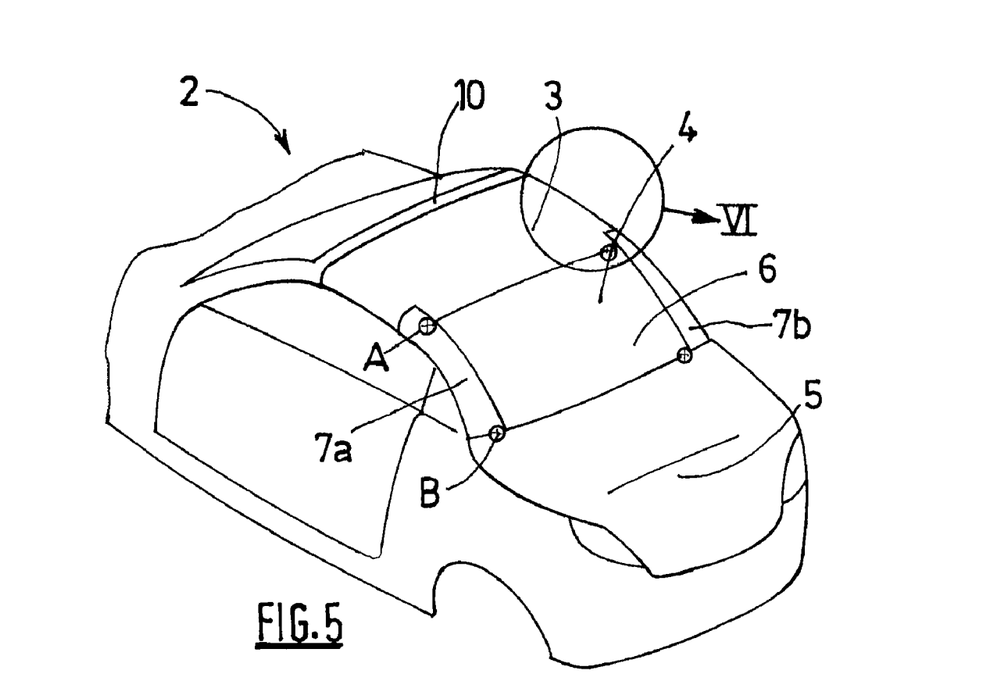
FIG. 5 is a perspective schematic view of a motor vehicle equipped with a roof including a front element and a rear element composed of a central element and two lateral elements positioned on either side of said central element.
Figure 6:
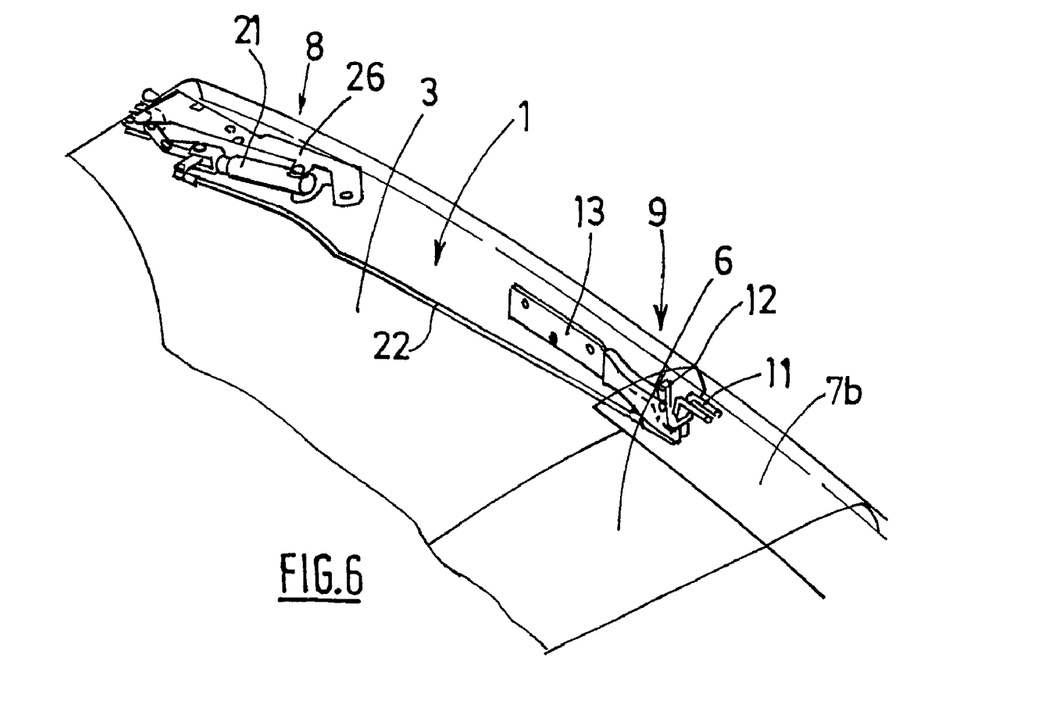
FIG. 6 is a perspective top view of a retractable roof of FIG. 5 equipped with a locking system according to the invention.

The motor vehicle 2 shown in FIG. 5 is equipped with a retractable roof comprising a front roof element 3 and a rear roof element 4. The front element 3 is pivotally mounted on a rear roof element 4 according to a rotation axis A and a rear roof element 4 is pivotally mounted on the frame of the vehicle 2 according to the rotation axis B. Thus, the front roof element 3 and the rear roof element 4 are movable between a position covering the passenger compartment of the vehicle 2 and a position retracted in the rear trunk 5 in which the front roof element 2 is folded onto the rear roof element 3.

The motion of the roof elements 3, 4 is controlled by two lateral arms, not shown, on the one hand pivotally mounted on the frame of the vehicle 2 and on the other hand mounted on the front element 3, close to such lateral edges.

In the embodiment shown, the rear roof element 4 is composed of a central element 6 and lateral elements 7a, 7b. The rear roof element 4 is pivotally mounted on the front roof element 3 by means of the central roof element 6 and the lateral elements 7a, 7b are pivotally mounted on the central element 6. When the roof elements 3, 4 are in the covering position (cf. FIG. 5), the lateral elements 7a, 7b are positioned on either side of the central roof element 6 and when the roof elements 3, 4 are in the retracted position, the central roof element 6 is shifted upwards with respect to the lateral elements 7a, 7b in order to increase the space available for storing luggage. The international patent application WO 2006/013249, in the name of the applicant, describes such type of retractable roof. In one embodiment of the invention described in the French patent application FR 2 872 456, the lateral elements 7a, 7b are pivotally mounted on the central roof element 6 using articulation rods 35 (refer to FIG. 9). The articulation rods are, on the one hand, pivotally mounted in 38 on the lateral roof element 7a, 7b, and on the other hand pivotally mounted in 39 on the central roof element 6.

In order to immobilize the retractable roof when it is in the recovering position, the roof is equipped with a locking system 1.

Advantageously, the locking system 1 is composed of a front locking device 8 for locking the roof on a fixed part of the vehicle, such as the windscreen crossmember 10, and a rear locking device 9 of the front roof element 3 on the rear roof element 4.

The rear locking device 9 for locking the front roof element 3 on the rear roof element 4 is composed of a strike 11 fixed to the rear roof element 4, a locking finger 12 pivotally mounted on a rear support 13 fixed to the front roof element 3 and a first 14 and a second 111 positioning members respectively fixed to the front roof element 3 and fixed to the rear roof element 4.

Figure 4:
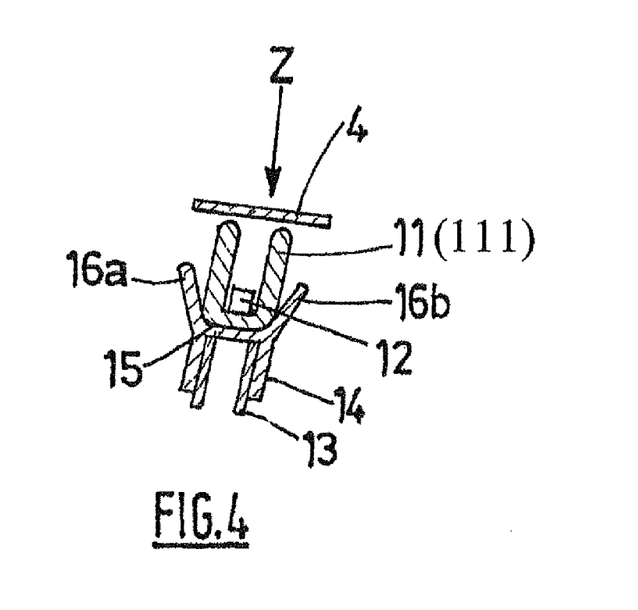
FIG. 4 is a sectional view according to plane IV-IV of FIG. 3 showing in a detailed way the first positioning member, the locking finger and the strike when the latter forms the second positioning member.

In one embodiment shown in greater details in FIG. 4, the strike 11 has the shape of a U the branches of which are fixed to a lateral roof element 7a, 7b. In order to improve the attachment of strike 11 of the lateral element 7a, 7b, the branches have an upper end extending towards the rear of the lateral element 7a, 7b.

The locking finger 12 is pivotally mounted on the support 13 between an unlocked position in which it exerts no contact with the strike 11 and a locked position in which the locking finger 12 exerts on the strike 11, at the level of the bottom of the U, a force along an axis Z. Advantageously, the axis Z is substantially vertical.

As a matter of fact, when the lateral elements 7a, 7b are pivotally mounted on the central rear roof element 6, these 7a, 7b are positioned slightly above the rear roof element 6, when the roof element 3, 4 comes close to the covering position. Consequently, it is important that the locking device 9 exerts a substantially vertical force, from top to bottom on the lateral element 7a, 7b in order to drive it and to press it towards the covering position thereof, while bearing on the rear central element 6 and/or on the rear edge of the front element 3.

Advantageously, when the roof elements 3, 4 are in the covering position, the second position member 111 comes to bear on a bearing area of the first member 14. The first member 14 forms a bearing surface which is substantially perpendicular to the axis Z. Thus, the second 111 and the first 14 positioning members make it possible to provide an accurate positioning of the roof elements 2, 3 in order to provide continuity of the roof body lines. In addition, the bearing of the second member 111 on the first member 14 allows an important locking force. The first positioning member 14 is fixed to the support 13 and bears on the upper edges of the supporting plates 13.

Thus, it can be noted that a locking device 9 according to the invention is particularly appropriate for a retractable roof comprising lateral elements 7a, 7b forming rear quarters.

Advantageously, the strike 11 forms the second member 111 (see FIG. 4) and when the finger 12 is in the locked position, it presses the strike 11 against the first positioning member 14.

The first positioning member 14 is composed of a bottom 15 and two lateral edges 16a, 16b. The bottom 15 forms the bearing area of the second positioning member 111 (the strike 11 in the embodiment shown in FIG. 4). Advantageously, the lateral edges 16a, 16b of the first positioning member 14 are flared and thus enable a precise lateral positioning of the second member 111 with respect to the first member 14. Thus, the lateral positioning of the rear roof element 4 is accurate with respect to the front roof element 3.

The support 13 is composed of two rigid plates made of pressed sheet metal. In a first front part, the plates are fixed together and gone through by holes 17 allowing the introduction of attachment members in order to fix the locking device 9 on the retractable roof. In a second rear part, the plates split and the locking finger 12 is accommodated between both supporting plates 13. Thus, the locking device 9 is a compact assembly. In addition, the plates are positioned substantially vertically against the lateral edge of the retractable roof. Thus, the lateral space requirement of the locking device is limited. This is particularly important insofar as the articulation of the actuation arms of the front roof element 3 is located close to the rear lateral edges of the front roof element 3.

In one first embodiment shown in FIGS. 1, 2, 3 and 6, the locking finger 12 is a rotatingly mounted finger on the support according to a substantially horizontal axis C.

The finger 12 has a slide 18 extending along the length of said finger 12 and the support 13 also has at least one slide 19. Advantageously, each support has a symmetrical slide 19 with respect to the axis of symmetry of the support 13. An actuating axis 20 is engaged into the slide 18 of the finger 12 and in the slide or slides 19 of the support 20. The actuating axis 20 is driven into the slides 18, 19 by an actuator so as to enable the tilting of the finger with respect to the axis C. In the embodiment shown, the motion of the actuator 21 is transmitted using a transmission device 22 such as a linkage.

Figure 1:
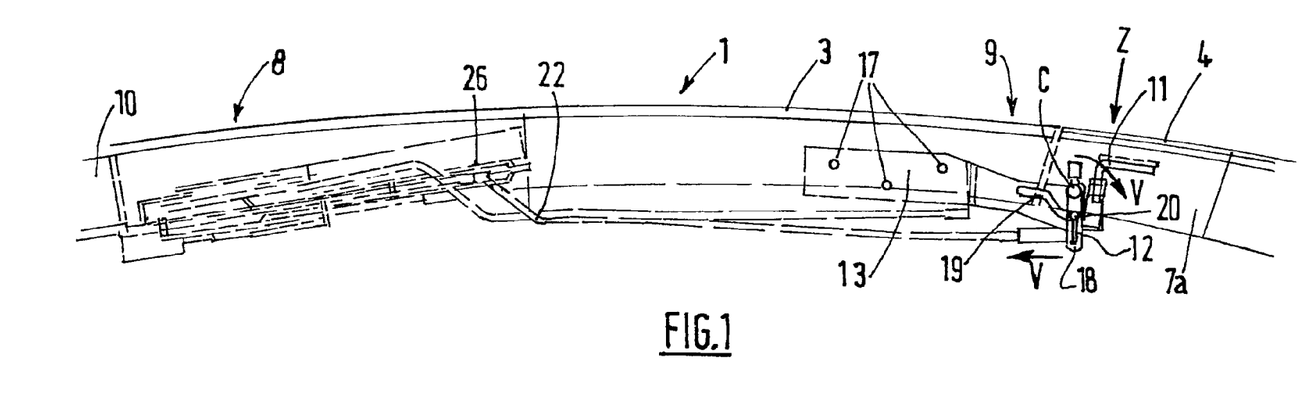
FIG. 1 is a side view of a locking system according to a first embodiment of the invention.

When the locking finger 12 is in the unlocked position, as shown in FIG. 1, the actuating axis 20 is positioned at the front end of the slide 19 and at the upper end of the slide 18. When the finger 23 is in the locked position (FIG. 3), the actuating axis is positioned at the rear end of the slide 19 and at the lower end of the slide 18.

The slide or slides 19 of the support has/have a particular shape making it possible to stabilize the position of the locking finger 12. As a matter of fact, in a front part of the slide 19, the slide 19 has a slope making it possible to drive the rotation of the finger towards the locked position thereof, whereas the slope is reversed towards the rear end of the slide. Thus, the locking finger 12 is blocked in a locked position without any motion from the actuator.

Figure 7:
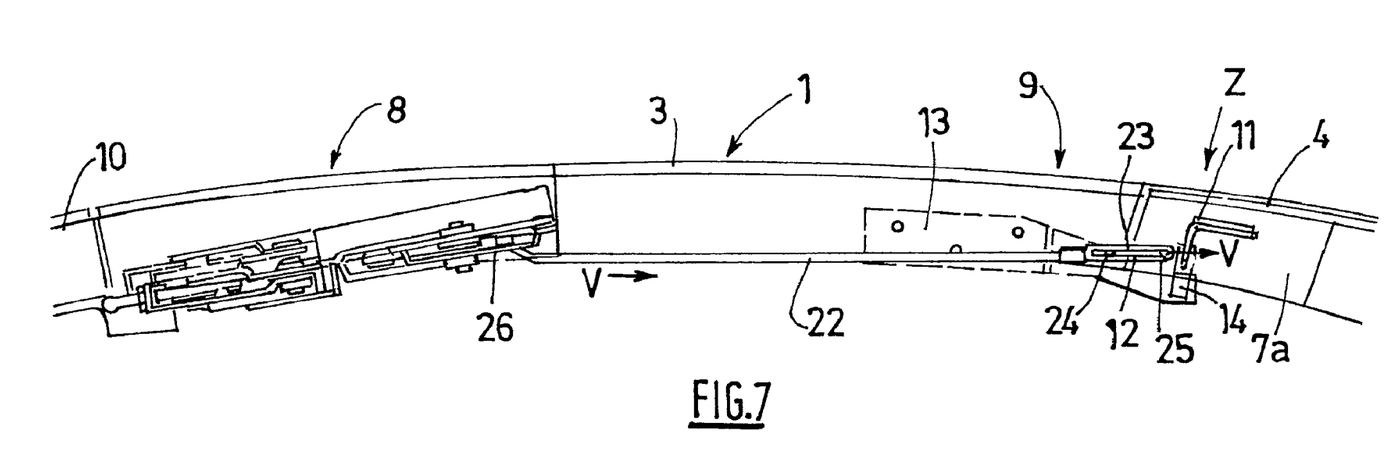
FIG. 7 is a side view of the locking system according to a second embodiment of the invention.
Figure 8:
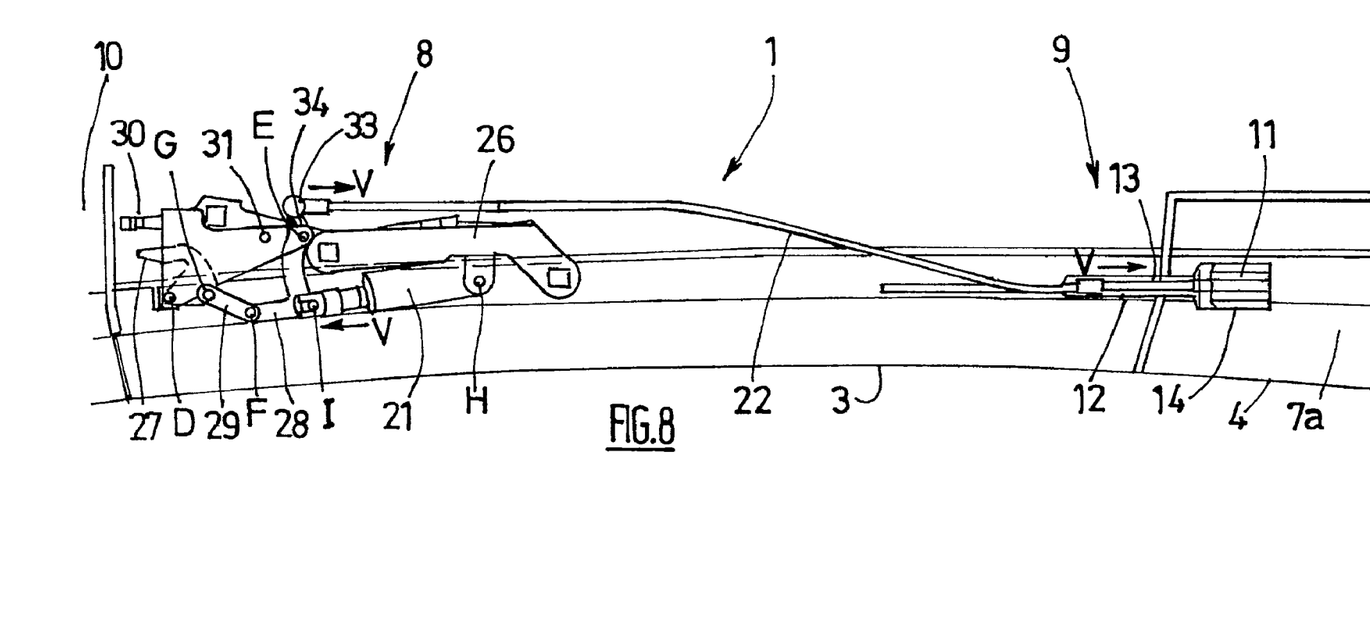
FIG. 8 is a top view of FIG. 7 showing a locking system according to a second embodiment.

In a second embodiment shown in FIGS. 7 and 8, the locking finger 12 is a finger slidingly mounted on the support 13.

For this purpose, the sliding finger 12 is equipped with a slide 23 extending along the length of said finger 12. The support 13 has two guiding pins 24, 25 engaged in said slide 23 and making it possible to guide the motion of the finger 12. Similarly, it can be provided that the locking finger 12 has two movable guiding pins in a slide fixed to a support 13.

In one embodiment, the surface of the finger 12 in contact with the strike 11 is disabled so that the locking force exerted by the finger 12 on the strike 11 progressively increases upon the sliding motion of the locking finger 12.

In order to obtain the same effects, it can also be provided that the slide 23 formed in the locking finger 21 has a slope. The front edge of said slide 23 is positioned above the rear edge of the slide 23 in order to apply to the strike 12 a force oriented from the top to the bottom, upon the locking.

An actuator 21 or a device for transmitting 22 the motion is fixed to the front end of the finger 12 in order to drive the sliding thereof. In the embodiment shown, a motion transmission device 22 such as a link makes it possible to transmit the motion of the actuator 21 to the locking finger 22.

Figure 9:
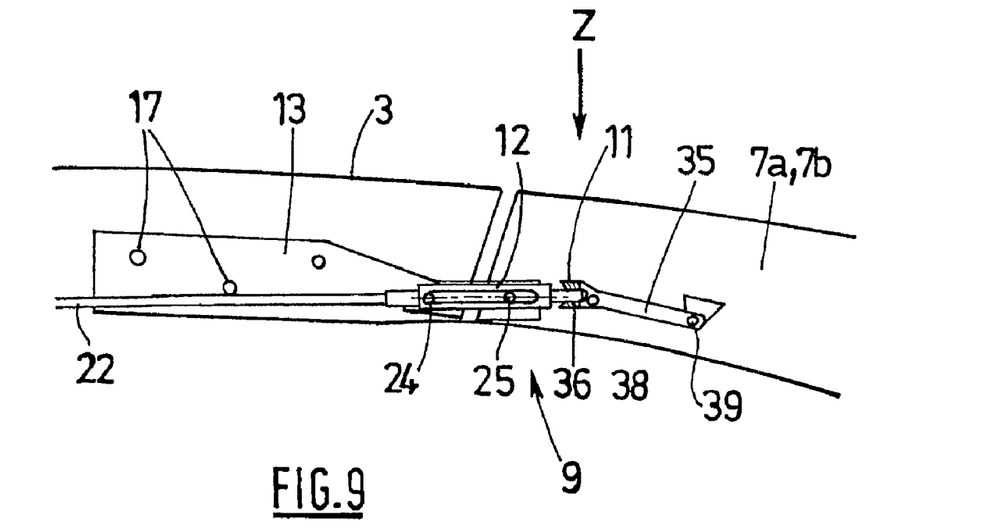
FIG. 9 is a lateral detailed view of the locking system of the front roof element on the rear roof element according to a third embodiment of the invention.
Figure 10:
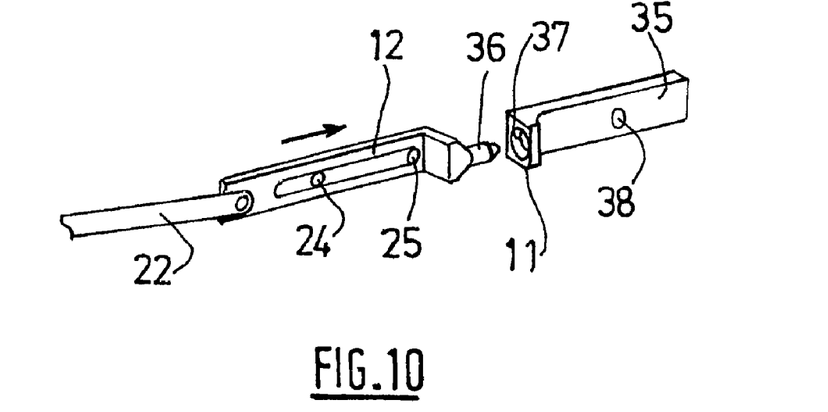
FIG. 10 is a detailed view of the sliding finger and the strike according to the third embodiment of the invention.

In a third embodiment shown in FIGS. 9 and 10, the strike 11 is fixed to a connecting rod 35 for articulating the lateral element 7a, 7b on the central element 6. The finger 12 can slide on the support 2 as in the second embodiment and has a tapered pin 36 at the rear end thereof, which engages into a hole 37 having a complementary shape, forming the strike 11. This particular embodiment allows an accurate positioning of the lateral elements 7a, 7b.

In the following, the front locking device 8 of the front roof element 3 on a fixed part 10 of the body of the vehicle, which is shown in greater details in FIGS. 2 and 8, will be described. Such a locking device is described in the French patent application FR 650881, not published yet.

In the embodiment of the invention shown, said device makes it possible to hold the front roof element 3 against the vehicle windscreen crossmember 10.

For this purpose, the front locking device 8 of the front roof element 3 on the windscreen crossmember 12 includes a support 26 fixed to the retractable roof, a mobile hook 27, an actuator 21 and means for transmitting the motion of the actuator 21 to the hook 27. The hook 27 is rotatingly mounted on the support 26 around a first axis D between a locked position on the strike, not shown, fixed to the crossing 12 of the windscreen and an unlocked position.

When the hook 27 is in the locked position, the locking force exerted by the hook 27 on the strike makes it possible to hold the front edge of the front roof element 3 pressed against the windscreen crossmember 10. Thus, the sealing between the roof and the crossing 10 is satisfactory and the roof is immobilized with respect to the vehicle.

The motion transmission means are composed of two connecting rods 28, 29. The first connecting rod 28 is, on the one hand, rotatingly mounted on the support about a second axis E and, on the other hand, pivotally mounted on the second connecting rod 29 about a third axis F. The second connecting rod 29 is rotatingly mounted on the hook 27 about a fourth axis G.

The actuator 21 is for example a linear actuator composed of a rod which can be moved in translation with respect to the body of the actuator 21. The body of the actuator 21 is rotatingly mounted on the support about a fifth axis H and the rod is rotatingly mounted on the first connecting rod about a sixth axis I.

The positioning means 30 make it possible to guide the roof laterally and vertically towards the covering position against the windscreen crossmember.

The rod of the actuator 21 is driven in translation with respect to the body of the actuator and thus causes the first connecting rod 28 to be pushed. Thus, the first connecting rod 28 is driven in rotation about the second axis E. The rotation of the first connecting rod 28 is transmitted to the hook 27 via the second connecting rod 29 and the hook 27 is driven in rotation about the first axis D and is moved towards the locking position thereof.

When the hook 27 moves from the unlocked position to the locked position, the third axis F moves to the other lateral of the plane going through the second axis E and the fourth axis G. In this position, if an effort is exerted on the hook 27 so as to drive it in rotation towards the unlocked position thereof, the first 28 and the second 29 connecting rods are driven in rotation in the direction opposite the unlocking motion thereof. However, a stop 31 makes it possible to stop the motion of the first 28 or second 29 connecting rod. In order to enable the unlocking, a force must be exerted by the actuator 21 on the first connecting rod 28 so that a third axis F moves back to the other side of the plane mentioned hereabove.

Thus, the transmission means are in a stable position when the locking device is in the locked position.

Advantageously, the support 26 is composed of two pressed plates mounted one above the other. Both plates sandwich all the pivots D to I of the actuator 21, the hook 27 and both connecting rods 28, 29. Both plates form a kind of casing so as to make up a compact assembly having an elongated shape. Such particular construction makes it possible to obtain a locking device 8 with small dimensions. In the embodiment shown, the supporting plates 26 are positioned horizontally and are fixed against the inner wall of the front roof element 3.

In one embodiment of the invention, the locking system 1 includes a single actuator 21 making it possible to cause the locking of the locking finger 21, of the rear locking device 9 and the locking member 27 of the front locking device 8.

Consequently, a device for transmitting 22 the motion is arranged so as to transmit the motion of the actuator 21 of the front locking device 8 to the rear locking device 9 or from the rear locking device 9 to the front locking device 8.

In the embodiment shown, the actuator 21 is mounted on the support 26 of the front locking device 8 and the transmission device 22 makes it possible to transmit the motion 22 to the locking finger of the rear locking device 9. The transmission device 22 is composed of "positive" transmission means, such as a linkage, making it possible to transmit the whole of the motion of the actuator 21.

Figure 2:
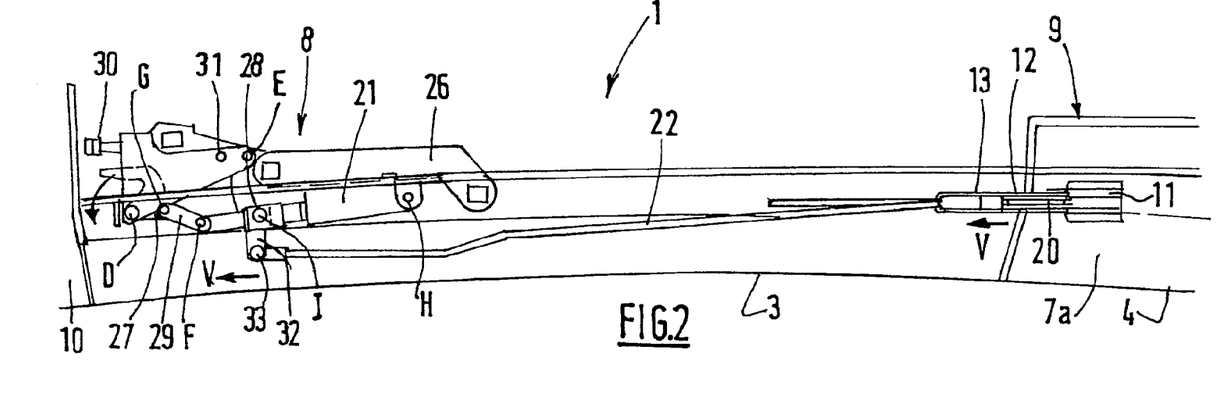
FIG. 2 is a top view of FIG. 1 showing a locking system according to the first embodiment of the invention.
Figure 3:
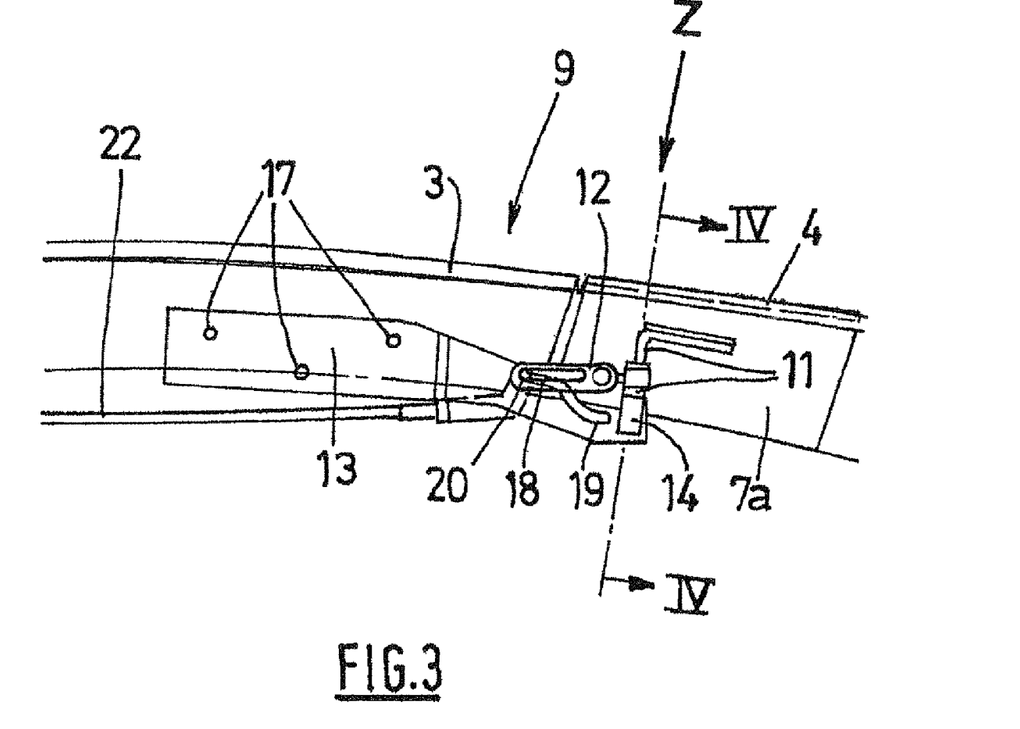
FIG. 3 is a detailed view of the locking device of the front roof element on the rear roof element according to a first embodiment of the invention.

In the first embodiment of FIGS. 1, 2 and 3, the linkage 22 is mounted, on the one hand, fixed to the actuator 20 of the rear locking device 9 and, on the other hand, it is pivotally mounted on the first connecting rod 28. In this embodiment, the first connecting rod 28 has an end 32 which protrudes at the opposite end of the articulation axis E of the first connecting rod 28 on the support 26. The articulation 33 of the linkage 22 on the first connecting rod 28 is positioned on said end 32. Thus, the motion transmission device is arranged so as to move the lower end of the locking finger 12 frontward upon the locking of the front locking device 8.

In the second embodiment shown in FIGS. 7 and 8, the linkage 22 is, on the one hand, fixed to the locking finger 12 and on the other hand it is pivotally mounted on the first connecting rod 28. In this embodiment, the first connecting rod 28 has an end 34 which protrudes on the opposite side of the articulation axis E of the first connecting rod 28 and the support 26 with respect to the articulation axis I of the actuator 21 on the first connecting rod 28. Thus, the motion transmission device is arranged so as to push the sliding finger 12 towards the back of the vehicle upon the unlocking of the front device 8.

The locking system 1 can easily be installed on the lateral parts of the front roof element 3. It should also be noted that the locking system may advantageously be used for a retractable roof equipped with lateral elements or not.

Advantageously, the motor vehicle 2 is equipped with two locking systems 1 according to the invention provided close to the lateral ends of the roof and positioned substantially along the roof.

The invention claimed is:

1. A device for locking (9) a retractable roof of a vehicle (2) composed of at least one front roof element (3) and one rear roof element (4), the front roof element (3) being pivotally mounted on the rear roof element (4) and the rear roof element (4) being pivotally mounted on a frame of the vehicle (2), the front roof (3) and rear roof (4) elements being movable between a position covering the passenger compartment of the vehicle (2) and a position retracted towards the rear trunk (5) of the vehicle (2), the rear roof element (4) comprising a central element (6) and two lateral elements (7a, 7b) positioned on either side of the central element (6) and pivotally mounted thereon, said locking device comprising:
   a strike (11) fixed to one of the lateral roof element elements (7a, 7b);
   a locking finger (12) pivotally mounted on a support (13) fixed to the front roof element (3) between an unlocked position and a locked position in which said locking finger (12) exerts on the strike (11) a force along an axis Z oriented downwards so as to press said one of the lateral roof elements (7a, 7b) towards its covering position bearing on at least one of the central element (6) and the front element (3).

2. A locking device (9) according to claim 1, wherein the locking finger (12) is a finger slidingly mounted on the support (13).

3. A locking device (9) according to claim 2, wherein the locking finger (12) has a slide (23) and the support has two guiding pins (24, 25) engaged in said slide (23) in order to guide the sliding motion of the locking finger (12).

4. A locking device (9) according to claim 2, wherein the locking finger (12) has a surface guiding the strike (11), which is bevelled.

5. A locking device (9) according to claim 1, wherein the locking finger (12) is rotatingly mounted on the support (13) along an axis C.

6. A locking device (9) according to claim 3, wherein the locking finger (12) has a slide (18) and the support (13) has at least one slide (19), with an axis (20) controlled by said actuator (21) being movable both in the slide (18) of the locking finger (12) and in the slide (19) of the support (13).

7. A locking device according to claim 1, wherein the strike (11) is mounted on a rod for the articulation of said one of the lateral roof elements (7a, 7b) on the central roof element (6).

8. A locking device (9) according to claim 1, wherein the support (13) is composed of two plates fixed to one another at a front part and splitting at a rear part in order to form a recess for the locking finger (12).

9. A motor vehicle comprising a retractable roof provided with a locking device system (1), the retractable roof comprising a front roof element (3) and a rear roof element (4), the front roof element (3) being pivotally mounted on the rear roof element (4), the rear roof element (4) being pivotally mounted on a frame of the vehicle (2), the rear roof element (4) comprising a central roof element (6) and two lateral roof elements (7a, 7b) positioned on either side of the central roof element (6) and pivotally mounted thereon, the front (3) and rear (4) roof elements being movable between a position for covering a passenger compartment of the motor vehicle (2) and a position retracted towards a rear trunk (5) of the motor vehicle (2), said locking system comprising:
a front locking device (8) for locking the front roof element (3) on a fixed part (10) of the vehicle (2), the front locking device comprising:
a front support (26) fixed to the front roof element (3) and positioned close to a front edge thereof;
a locking member (27) pivotally mounted on said front support (26) between an unlocked position and a locked position on a first strike fixed to a fixed part (10) of the first motor vehicle (2);
a rear locking device (9) for locking the front roof element (3) on the rear roof element (4), the rear locking device including comprising:
a rear support (13) fixed to the front roof element (3) and positioned close to a rear edge thereof;
a second strike (11) fixed to one of said two lateral roof elements;
a locking finger (12) pivotally mounted on said rear support (13) between an unlocked position and a locked position on the second strike (11);
one of the front locking device (8) and the rear locking device (9) being equipped with a single actuator (21) making it possible to control a locking motion of the locking member (27) and of the locking finger locking finger (12), said locking system (1) further comprising a device for transmitting motion (22) of one of:
the front locking device (8) towards the rear locking device (9), and,
the rear locking device (9) towards the front locking device (8),
in said locked position, said looking finger (12) exerts on the second strike (11) a force along an axis Z oriented downwards to press the lateral roof element (7a, 7b) towards said covering position bearing on at least one of the central roof element (4) and the front element (3).

10. The vehicle according to claim 9, wherein said single actuator (21) is mounted on said front support (26) of the front locking device (8).

11. A retractable roof comprising a front roof element (3) and a rear roof element (4), the rear roof element (4) comprising a central roof element (6) and two lateral roof elements (7a, 7b) positioned on either side of the central element (6) and pivotally mounted thereon, the front roof element (3) being pivotally mounted on the rear roof element (4), and the rear element (4) being pivotally mounted on a frame of a vehicle (2), the front (3) and rear (4) roof elements being movable between a position for covering the passenger compartment of the vehicle and a position retracted in a rear trunk (5) of the vehicle (2), said retractable roof being equipped with a locking device (9) comprising:
a strike (11) fixed to one of the lateral roof elements (7a, 7b);
a locking finger (12) pivotally mounted on a support (13) fixed to the front roof element (3) between an unlocked position and a locked position in which said finger (12) exerts on the strike (11) a force along an axis Z oriented downwards to press said one of the lateral roof elements (7a, 7b) towards the covering position in which it bears on one of the central roof element (6) and the front roof element (3).

12. The retractable roof according to claim 11, including two of said locking systems (1) devices positioned close to lateral edges of said retractable roof.

* * * * *

UNITED STATES PATENT AND TRADEMARK OFFICE
CERTIFICATE OF CORRECTION

| | | |
|---|---|---|
| PATENT NO. | : 8,167,355 B2 | Page 1 of 1 |
| APPLICATION NO. | : 12/297937 | |
| DATED | : May 1, 2012 | |
| INVENTOR(S) | : David Guetet | |

It is certified that error appears in the above-identified patent and that said Letters Patent is hereby corrected as shown below:

On the Title Page, please add second Assignee:

(73) ASSIGNEE: RENAULT S.A.S., BOULOGNE-BILLANCOURT (FR)

Signed and Sealed this
Second Day of October, 2012

David J. Kappos
*Director of the United States Patent and Trademark Office*